United States Patent [19]

Zemlin

[11] Patent Number: 4,879,032
[45] Date of Patent: Nov. 7, 1989

[54] FLUID SEPARATORY DEVICES HAVING IMPROVED POTTING AND ADHESIVE COMPOSITIONS

[75] Inventor: John C. Zemlin, Reading, Mass.

[73] Assignee: Allied Resin Corporation, East Weymouth, Mass.

[21] Appl. No.: 616,736

[22] Filed: Jun. 4, 1984

[51] Int. Cl.$^4$ ............................................. B01D 13/00
[52] U.S. Cl. ............................ 210/321.61; 210/321.8; 210/321.89; 528/56
[58] Field of Search ............... 210/321.1, 321.2, 321.3, 210/321.4, 321.5, 321.61, 321.8, 321.89; 528/55, 56

[56] References Cited

U.S. PATENT DOCUMENTS

4,224,164  9/1980  Brauer et al. .................... 210/321.3
4,332,927  6/1982  Simone ........................ 210/321.4 X
4,359,359  11/1982  Gerlach et al. .............. 210/321.1 X

Primary Examiner—Frank Spear
Attorney, Agent, or Firm—Wolf, Greenfield & Sacks

[57] ABSTRACT

Fluid separatory devices containing novel polyurethane potting and adhesive compositions comprising the reaction product of an aliphatic polyisocyanate with a propoxylated polyether amine in the presence of a metallo-organic catalyst selected from the group consisting of the organic acid salts and the β-diketonates of zinc, iron, copper, manganese, mercury, lead, and mixtures thereof, said catalyst being present in an amount effective to substantially increase the cure rate and prevent bubble formation. Nontoxic metallo-organic catalysts based on zinc, iron, and copper are preferred for use in separatory devices for blood dialysis and water purification.

36 Claims, 1 Drawing Sheet

FLUID SEPARATORY DEVICES HAVING IMPROVED POTTING AND ADHESIVE COMPOSITIONS

FIELD OF THE INVENTION

This invention relates to polyurethane potting and adhesive compositions particularly useful in fluid separatory devices for blood dialysis and reverse osmosis. The compositions are produced by the condensation of an aliphatic polyisocyanate and a propoxylated polyamine in the presence of certain metallo-organic catalysts. Such compositions resist bubbling in the presence of moisture and exhibit excellent adhesion to cellulosic substrates.

BACKGROUND OF THE INVENTION

A large number of polyurethane potting and sealing compositions have been developed and sold commercially over the past several decades. An early discussion regarding mixtures of aromatic diisocyanates and castor oil can be found on pages 788–781 of "Polyurethanes: Chemistry and Technology," Part II, by Saunders and Frisch, Interscience Publishers, John Wiley & Sons, New York (1962). More recent example of aromatic isocyanate based potting and sealing compositions are found in U.S. Pat. Nos. 4,359,359 and 4,224,164 and Canadian Pat. No. 914,850.

U.S. Pat. No. 4,359,359 concerns the method of reacting an aromatic diisocyanate in stoichiometric excess with a mixture of castor oil and trimethylolpropane to yield a prepolymer containing unreacted isocyanate groups and being sufficiently flowable to permit coating onto membrane surfaces, and subsequently hardening the prepolymer by addition of a cross-linking agent consisting essentially of castor oil alone or another mixture of castor oil with trimethylolpropane in an amount sufficient to cross-link a majority of the unreacted isocyanate groups. The addition of a small amount of iron acetyl acetonate is said to improve the cross-linking of the prepolymer and to reduce bubble formation. Further, use of an aromatic diisocyanate which contains about 10 to 50 mole percent isophorone diisocyanate is said to improve adherence to cellulosic membranes. The compositions are said to be useful for mounting semipermeable membranes in dialysis equipment.

U.S. Pat. No. 4,224,164 concerns a potting compound for hollow fiber separatory devices used in biomedical applications. A polyol mixture of at least one polyol and 1 to 15% by weight N-N-N'-N'-tetrakis (2-hydroxypropyl) ethylene diamine (known commercially as "Quadrol", registered trademark of BASF Wyandotte Corp., Parsippany, N.J.) is mixed at an NCO/OH ratio of 1 to 1.1′1 with an isocyanate terminated polyurethane based prepolymer, wherein sufficient Quadrol ® is present to cause the urethane system to increase rapidly in viscosity and thereby reduce wicking of the urethane in the hollow fibers. The polyol may be castor oil, esters of castor oil, polyethers such as polyoxypropylene glycol and polytetramethylene glycol, homopolymers or copolymers of hydroxyl bearing butadiene, and hydroxyl bearing polyesters, such as polyethylene glycol adipate and the like and combinations thereof. The isocyanate may be an aromatic or aliphatic isocyanate. Applicant has tested a composition containing an aliphatic diisocyanate, castor oil, and Quadrol ® and found that it exhibits considerable gassing in the presence of moisture.

Canada Pat. No. 914,850 concerns the condensation products of polyoxyalklyene polyamines and alkylene oxide and a method of making urethane foams with the same. In Example 6 of the Canadian patent a rigid foam is prepared by first combining propoxylated polyoxypropylenetriamine, silicone oil as a surfactant, and trichlorofluoromethane as a blowing agent, and then adding a polyaryl polyisocyanate.

The use of aliphatic isocyanates in potting and sealing compositions is sometimes restricted owing to their significantly higher cost. Their use may be justified where light stability (i.e., absence of darkening on exposure to UV and visible light), higher hydrolytic stability, or the absence of aromatic structures is desired. Aromatic isocyanates are typically prepared from aromatic amines, some of which are potentially toxic or even carcinogenic, and trace amounts of aromatic amines often either persist in the isocyanate or are formed by slow hydrolysis of the isocyanate or the isocyanate derived polymer. The absence of aromatic amines is particularly important in biomedical applications including blood dialysis and in applications involving the treatment of food or potable water.

A problem which frequently arises in the use of either aromatic or aliphatic isocyanate based polyurethane potting compositions with moisture-containing substrates is the tendency of such compositions to gas or form bubbles during the curing cycle. The compositions of the above-referenced patents each have a problem with one or more of bubbling, toxicity, and poor adhesion to cellulosic substrates.

SUMMARY OF THE INVENTION

It is an object of this invention to provide a polyurethane composition which permits potting dry or very wet (i.e., water-saturated) substrates rapidly and without bubble formation.

Another object is to provide such polyurethane compositions which are not toxic and thus are useful as potting and adhesive compositions in fluid separatory devices used in the medical, food, or water purification industries.

Another object is to provide such polyurethane compositions which exhibit excellent adhesion to dry or very wet cellulosic substrates.

According to this invention, a polyurethane potting and adhesive composition is provided which comprises the product of reacting an aliphatic polyisocyanate with a propoxylated polyether amine in the presence of certain metallo-organic catalysts. The aliphatic polyisocyanate has the structural formula:

where $R_1$ has from 2 to 36 C atoms, the -NCO groups are not directly bonded to an aromatic ring, and X is an integer of at least 2. A preferred polyisocyanate is isophorone diisocyanate. The propoxylated polyether amine has the structural formula:

where $R_2$ is a linear or slightly branched predominantly polyisopropoxy chain having a molecular weight of from about 200 to about 8,000, $R_3$ is selected from the group consisting of isopropoxy and diisopropoxy, and Y is an integer of at least 2. A preferred propoxylated polyether amine is completely isopropoxy, predominantly a tertiary amine, and has a molecular weight of about 2,000.

The reaction is carried out in the presence of a metallo-organic catalyst selected from the group consisting of the organic acid salts and β-diketonates of zinc, iron, copper, manganese, mercury, lead, and mixtures thereof. Preferred catalysts are the acetyl acetonates based on zinc, iron, and copper.

The compositions of this invention have an NCO-/OH equivalent ratio of from about 0.5 to about 1.5, preferably from about 0.8 to about 1.2, and more preferably from about 0.9 to about 1.05. The metallo-organic catalyst is included in an amount sufficient to substantially increase the reaction rate, preferably from about 0.001 to about 5.0% by weight of the composition, and more preferably from about 0.01 to about 0.5%.

To improve adhesion to cellulosic substrates, a preferred composition includes an adhesion-improving polyol having a molecular weight of greater than about 200 and selected from the group consisting of polycaprolactones, adipic acid derived polyesters, and mixtures thereof. Further, to modify the hardness, a low molecular weight chain extender polyol such as Quadrol ® is included.

The compositions of this invention are particularly useful as potting and adhesive compounds in hollow fiber fluid separatory devices and in scroll-type fluid separatory devices but also have use as potting and adhesive materials for other applications particularly where cellulose is to be potted or adhered in the presence of moisture and bubbling is desirably avoided. Especially preferred for separatory devices used in the medical, food, or water industries are the compositions prepared with the nontoxic metallo-organic catalysts based on zinc, iron, and copper. Especially preferred are copper acetyl acetonate for use with reverse osmosis cartridges because of its exceptional nonreactivity in the presence of water and zinc acetyl acetonae for use with blood dialysis cartridges because of its superior nontoxicity.

The invention further comprises a method for preparing polyurethane potting and adhesive compositions which comprises reacting an aliphatic polyisocyanate with a propoxylated polyether amine in the presence of a metallo-organic catalyst selected from a group consisting of the organic acid salts and β-diketonates of zinc, iron, copper, manganese, mercury, lead, and mixtures thereof. In a preferred embodiment, a high molecular weight polyol is included to improve the adhesion and a prepolymer of the aliphatic polyisocyanate and high molecular weight polyol is prepared first.

DETAILED DESCRIPTION OF THE PREFERRED EMBODIMENTS

I have discovered that the reaction product of an aliphatic polyisocyanate with a propoxylated polyether amine in the presence of certain metallo-organic catalysts will permit potting from dry to very wet substrates rapidly and without bubble formation.

The potting and adhesive compositions of this invention are prepared by reacting an aliphatic polyisocyanate and a propoxylated polyether amine in the presence of a metallo-organic catalyst selected from the group consisting of the organic acids salts and β-diketonates of zinc, iron, copper, manganese, mercury, lead, and mixtures thereof. In addition, lesser amounts of other polyols may be included to obtain improved adhesion, higher water-repelling properties, varying solvent permeabilities, and the like. Further contemplated is the use of low molecular weight chain extenders to increase the hardness of the cured compositions, as well as catalysts to increase cure rates, and fillers and extenders to color, cheapen, or otherwise modify the final physical properties of the compositions.

The aliphatic polyisocyanate can be any polyisocyanate where the -NCO group is not directly connected to an aromatic ring. The aliphatic polyisocyanate has the formula:

$$R_1(NCO)_X \qquad (A)$$

where $R_1$ has from 2 to 36 carbon atoms, the -NCO groups are not directly bonded to an aromatic ring, and X is an integer of at least 2. $R_1$ can be a saturated or unsaturated, straight or branched chain, alkyl, cycloalkyl, or aryl radical having from 2 to 36 C atoms, so long as any aromatic rings are not directly bonded to the —NCO groups. Preferred aliphatic polyisocyanates are:
isophorone diisocyanate
ethylene diisocyanate
propylene diisocyanate
hexamethylene diisocyanate
decamethylene diisocyanate
cyclohexylene diisocyanate
2,4'-methylene bis (cyclohexyl isocyanate)
4,4'-methylene bis (cyclohexyl isocyanate)
the biuret of hexmethylene diisocyanate
trimethyl hexamethylene diisocyanate
tetramethyl xylene diisocyanate Tetramethyl xylene diisocyanate is an example of an aliphatic polyisocyanate containing an aromatic ring which is not directly bonded to the —NCO groups. The aliphatic polyisocyanates are readily available on the market. A particularly preferred aliphatic polyisocyanate is isophorone diisocyanate, such as that sold by Chemische Werke Hüls A. G., Marl, West Germany.

The propoxylated polyether amine has the formula:

(B)

where $R_2$ is a linear or slightly branched predominantly polyisopropoxy chain having a molecular weight of from about 200 to about 8000, $R_3$ is selected from the group consisting of isopropoxy and diisopropoxy having the structural formula:

and Y is an integer of at least 2.

$R_2$ is predominantly polyisopropoxy and it is preferred that this backbone be completely isopropoxy. Minor amounts (in an amount less than about 10% by weight, and preferably less than about 5%) of other groups can be present such as ethoxy, butoxy, and higher analogs up to dodecoxy. When $R_2$ is completely isopropoxy it has the formula:

where m is an integer of from 1 to 150. When $R_2$ is not completely isopropoxy, up to 10% by weight of ethoxy, butoxy, etc., up to dodecoxy, may be substituted for the isopropoxy groups, by methods which are well-known in the art (see Canada Pat. No. 914,850). The molecular weight of $R_2$ is preferably of from about 200 to about 4000.

Preferably Y is an integer of from 2 to 6, more preferably 2 or 3, and most preferably 2. Glycerin, trimethylol propane, and the like, may be used to obtain branching.

Preferred polyether amines useful in preparing the propoxylated polyether amine of formula (B) are the amine-terminated polypropylene oxide condensates manufactured by Texaco Inc., Houston, Tex., and sold under the trade name "Jeffamine" (registered trademark). The Jeffamine ® compounds are commercially available as difunctional and trifunctional materials whose molecular weights range from about 230 to 2000. The 2000 molecular weight product is especially useful in developing a range of physical properties. The lower molecular weight derivatives yield final compositions which are very hard. Other suitable amine-terminated polypropylene oxide condensates are sold by: Union Carbide Corp., New York, N.Y.; Dow Chemical Co., Midland, Mich.; and Farbenfabriken, Bayer A.G., New York, N.Y. Additional amine terminated polyethers useful in preparing the propoxylated amines of this invention are disclosed in U.S. Pat. Nos. 3,236,895 and 3,654,370.

The propoxylation of the polyether amines is described in Canada Pat. No. 914,850 and German Patentschrift 1,917,408. The polyether amines should be substantially propoxylated, meaning at least about 80 percent propoxylated; 90% propoxylated amines are about what good manufacturing will produce. While more than one isopropoxy group can be substituted at each amine hydrogen site, it is strongly preferred that only one isopropoxy group be present because the tertiary amine appears to act more strongly as a catalyst for isocyanate reactions herein.

Although mixtures of an aliphatic polyisocyanate and the propoxylated amine will react to form a cured composition, the reaction at room temperature is slow, requiring several hours or more. Further, if water is present, bubble formation will occur during such a slow cure. Thus, it is desirable to use a catalyst to accelerate the reaction. I have found certain metallo-organic catalysts to be most useful, namely the organic acid salts and β-diketonates of zinc, iron, copper, manganese, mercury, lead, and mixtures thereof. Particularly preferred, because of their decreased toxicity characteristics, are the organic acid salts and β-diketonates of zinc, iron, and copper.

Other metals which were tried but did not work include vanadium, titanium, antimony, cobalt, nickel, calcium, and zirconium, all of which gave a poor or no cure, and tin which caused gassing.

The organic group of the acid may be saturated or unsaturated, and contain from 1 to 30 carbon atoms as long as the acid salt is soluble in the propoxylated polyether amine. Suitable organic acid salts include octoate, napthenate, stearate, and the like.

The β-diketonates have the structural formula:

where $R_5$ and $R_6$ can be alkyl, cycloalkyl, or aryl and each contain from 1 to about 12 C atoms. Suitable β-diketonates are benzoyl acetone, dibenzoyl methane, and acetyl acetonate. $R_5$ and $R_6$ are preferably the same and more preferably are each —$CH_3$ (acetyl acetonate). Preferred β-diketonates are the acetyl acetonates of zinc, iron, and copper.

In general, the polyurethane compositions of this invention have an NCO/OH equivalent ratio of from about 0.5 to about 1.5, preferably from about 0.8 to about 1.2, and more preferably from about 0.9 to about 1.05. The metallo organic catalyst is included in an amount sufficient to substantially increase the reaction rate, preferably from about 0.001 to about 5.0% by weight of the composition, and more preferably from about 0.01 to about 0.5%.

The compositions of this invention contain from about 10 to about 50% aliphatic polyisocyanate by weight of the total composition, from about 20 to about 90% by weight of propoxylated amine, and from about 0.001 to about 5.0% by weight of metallo-organic catalyst. Preferably they contain from about 15 to about 40% aliphatic polyisocyanate, from about 20 to about 85% propoxylated amine, and from about 0.005 to about 3.0% metallo-organic catalyst. More preferably they contain from about 17 to about 35% aliphatic polyisocyanate, from about 20 to about 80% propoxylated amine, and from about 0.01 to about 0.5% metallo-organic catalyst.

The compositions of the invention may also include other polyols to improve the adhesion and the hardness provided they do not exceed about 40% of the total weight of the composition and preferably less than about 30%.

The polarity or wetting tendency of the compositions of this invention may be modified to improve adhesion to cellulosic substrates by adding minor amounts of a high molecular weight polyol, i.e., a molecular weight above about 200, and preferably of from about 400 to about 800. Preferred adhesion-improving polyols, because of their nontoxicity, are the polycaprolactones, adipic acid derived polyesters such as ethylene-butylene adipates, and combinations thereof. Of these, particularly useful for increasing the bonding strength to polar substrates such as cellulose acetates are the "Niax" polycaprolactone diols and triols (registered trademark of Union Carbide Corp., New York, N.Y.) and more particularly the lower melting point products, i.e., those with molecular weights under 1000. Also preferred for use with polar substrates is a mixed polyester polycaprolactone sold under the tradename Niax ® Polyol D-737. The adhesion-improving polyols should comprise from about 5 to about 30% by weight of the total composition and preferably from about 10 to about 25%.

When such high molecular weight adhesion-improving polyols are used, it is often desirable to preact them with the polyisocyanate, thus preparing a prepolymer having —NCO end groups. In this manner, problems associated with the varying reaction rates of the major and minor polyols can be reduced or eliminated.

It is also desirable to modify the hardness of the compositions of this invention and this is preferably done by adding a low molecular weight polyol chain extender to the major polyol (i.e., the propoxylated polyether amine) so that more isocyanate will be required to completely cure the composition. The chain extender should have a molecular weight below about 500. Preferred chain extender polyols are tetrahydroxypropylethylenediamine (known commercially as Quadrol ® ), triisopropanolamine, ethylene glycol, 1,4 butane diol, glycerin, and hydroxypropyl carbonate. The first two compounds are particularly useful since they appear to react at about the same rate as the major polyol, and Quadrol ® is preferred because of its better solubility in polyols. A discussion of the addition of chain extenders to modify the hardness of polyurethane potting compounds is found in "Polyurethane Elastomers" by C. Hepburn, Applied Science Publishers, Barking Essex, England, pp. 101–104 (1982).

The addition of fillers, plasticizers, dyes, pigments, wetting agents, adhesion promoters, antioxidants, and ultra-violet absorbers is also useful in some applications. These are well known to compounders of polyurethanes. Some sealing and potting compositions are advantageously thickened by mixing in from about 5 to 12% of a high surface silica such as "Cab-O-Sil" (registered trademark of Cabot Corp., Boston, Mass.). Other known additives for improving adhesion are the silanes such as amino silanes, epoxy silanes, titanate esters, and the like.

A preferred composition of this invention containing isophorone diisocyanate, a propoxylated polyether amine prepared from Jeffamine ® D-2000, zinc acetyl acetonate, Niax ® Polyol PCP-0210, and Quadrol ® (see Example 4), was tested with the following three substrates and found to cure rapidly without bubble formation: regenerated cellulose made by the cuprammonium process; cellulose acetate; and saponified cellulose acetate.

The cured polyurethane compositions of this invention are particularly useful as potting and adhesive compounds in fluid separatory devices employed for reverse osmosis, hemodialysis, ultra-filtration, etc. For example, hollow fiber separatory devices consist of a plurality of fine hollow fibers whose end portions are potted in a tube sheet and whose open fiber ends terminate in a tube sheet face which provides liquid access to the interior of the fibers. The hollow fiber bundle is sealed within a casing to form a separatory cell having one or more liquid ports which allow for the passing of one fluid through the fibers and another around the fibers without mixing of the two fluids. The tube sheet materials should fill the space between the hollow fibers and yet not deform them. Moreover, the cut edge of the hollow fibers must remain substantially circular after cutting. In biomedical applications the tube sheet must be nontoxic. Patents representive of the art of hollow fiber separatory devices include U.S. Pat. Nos. 2,972,349; 3,228,876; 3,228,877; 3,422,008; 3,423,491; 3,339,341; and 3,503,515.

Figure 1:
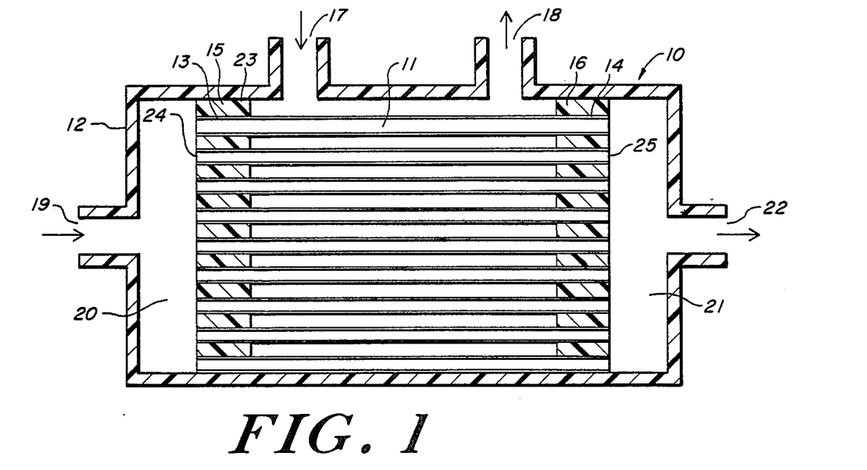
FIG. 1 is a cross-sectional view of a hollow fiber fluid separatory device.

Shown in cross section in FIG. 1, is a hollow fiber separatory device 10 used for hemodialysis in which the compositions of this invention serve as potting compounds. The purpose of the device is to separate out (i.e., by dialysis) impurities from blood, for example, removing the metabolic degradation products in the blood of a patient who has a kidney malfunction. Separatory device 10 includes a plurality of hollow, fine fibers 11 disposed substantially parallel to one another in a cylindrical casing 12. Fibers 11 are typically made of cellulose, such as regenerated cuprammonium cellulose (Cuprophan), cellulose acetate, or saponified cellulose acetate. Casing 12 is typically made of a clear plastic such as polymethyl methacrylate. Terminal portions 13 and 14 at opposing ends of the hollow fibers are sealed in tube sheets 15 and 16 and the open ends of the fibers terminate in tube-sheet faces 24 and 25. Tube sheets 15 and 16 are made of the compositions of this invention and seal the exterior terminal portions only of the hollow fibers 11 to each other and to the interior wall 23 of casing 12.

In use, the untreated blood under a slight positive pressure enters the left-hand port 19 in the casing and flows through the chamber 20 and into the interior of the hollow fibers. A saline solution under a slight negative pressure enters the casing through a saline entrance port 17, circulates around the exterior of the hollow fibers, and exits through saline exit port 18. Low molecular weight impurities in the blood pass through the walls of the hollow fibers 11 and are picked up and removed by the saline solution. The dialyzed blood exits the fibers into a chamber 21 and out of the casing through right-hand port 22.

Tube sheets 15 and 16 insure that neither blood nor saline solution leak into the other. The potting and adhesive compositions of this invention provide excellent adhesion to the cellulose fibers and to the polymethyl methacrylate casing. Those compositions prepared with the metallo-organic catalysts based on zinc, copper, iron, and mixtures thereof are preferred, because of their low toxicity, for use in blood dialysis separatory devices. Especially preferred, because of its extremely low toxicity, is zinc acetyl acetonate.

Figure 2:
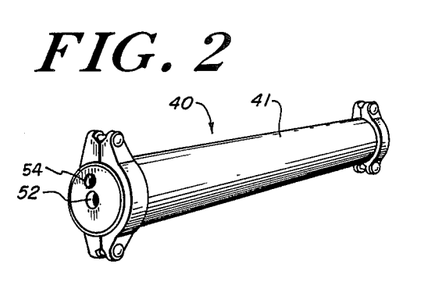
FIG. 2 is a perspective view of the pressure vessel of a scroll-type separatory device.
Figure 3:
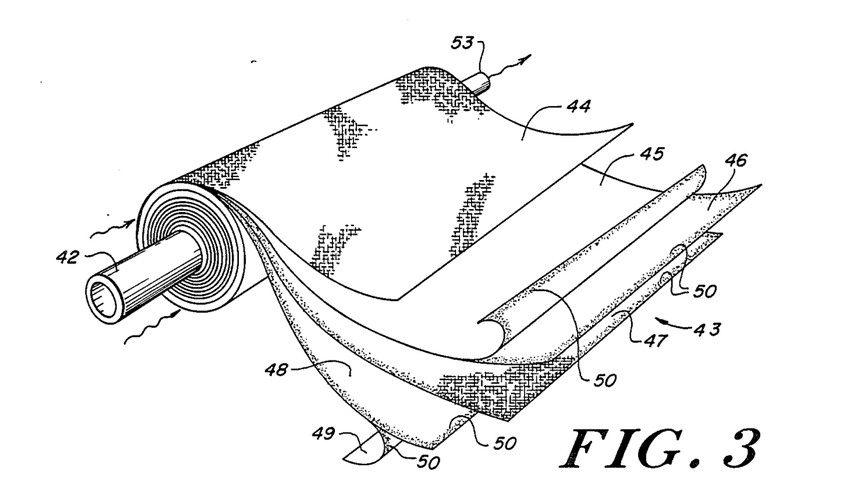
FIG. 3 is a perspective view of the sandwich bag and central tube of the scroll-type separatory device.
Figure 4:
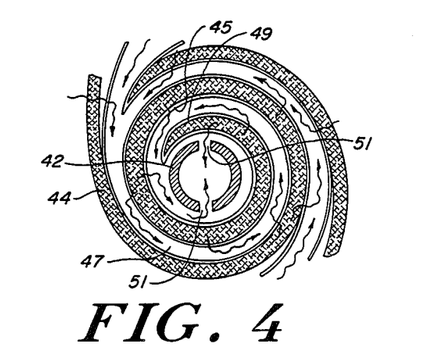
FIG. 4 is a cross-sectional view of the sandwich bag and central tube of the scroll-type separatory device.

Another known separatory device for reverse osmosis and ultrafiltration uses sheets of semipermeable membranes wound in scroll-type fashion around a central permeate tube. The scroll-type reverse osmosis cartridge may be used, for example, to prepare fresh water from salt water or to remove proteins from water which has been used in the manufacture of cheese. Shown in FIGS. 2–4 is a scroll-type separatory device 40 in which the compositions of the present invention are advantageously used. Separatory device 40 consists of a pressure vessel 41 having a first port 52 and a second port 54 and disposed within vessel 41 a central permeate tube 42 about which is rolled one or more "sandwich bags" 43 each separated by a coarse mesh spacer 44. The left-hand end of central tube 42 is disposed in first port 52 and the right-hand end of central tube 42 is disposed in a third port on the opposing face of the vessel (not shown). Each sandwich bag 43 consists of a plurality of layers adhesively bonded along their edges; the layers include a first membrane 45, a first backing 46, an open mesh permeate carrier 47, a second backing 48, and a second membrane 49. First and second membranes 45 and 49 are thin, semipermeable, and typically made of cellulose acetate. First and second backings 46 and 48 are made of a permeable fabric and serve to support the thin membranes. The adhesive compositions of this invention serve as an adhesive bond 50 by which the edges of the layers of the sandwich bag are secured together. The preferred compositions are prepared with the nontoxic metallo-organic catalysts based on zinc, iron, and copper; especially preferred is copper acetyl acetonate because of its superior stability in the presence of water.

In use, contaminated water under high pressure enters the vessel 41 through second fort 54, enters the left end of the scroll, and travels across the mesh spacer 44. Water molecules pass through the membranes 45 and 49 and backings 46 and 48 into the permeate carrier 47 and travel along the permeate carrier 47 to the central tube 42. The path of the water molecules is designated by arrows in FIG. 4. The permeate carrier 47 extends from the edge of the sandwich bag around the central tube 42 allowing the water molecules to pass through holes 51 in the central tube. The purified water exits from the right-hand port 53 of the central tube.

In the method of the invention, the polyurethane potting and sealing composition is prepared by reacting an aliphatic polyisocyanate with a propoxylated polyether amine in the presence of a metallo-organic catalyst selected from the group consisting of the organic acid salts and β-diketonates of zinc, iron, copper, manganese, mercury, lead, and mixtures thereof. The method also includes the addition of a high molecular weight polyol to improve adhesion and a low molecular weight chain extender to increase the hardness. Frequently, the additional high molecular weight minor polyol is prereacted with the polyisocyanate to prepare a prepolymer.

The reaction of the aliphatic polyisocyanate and propoxylated polyether amine in the presence of the metallo-organic catalyst is carried out at a temperature of from about 0° to about 125° C., more preferably from about 20° to about 60° C., and for a time of from about 1 to about 600 minutes, and more preferably of from about 2 to about 60 minutes. When the high molecular weight adhesion-improving polyol is used, preferably a prepolymer of the adhesion-improving polyol and the aliphatic polyisocyanate is prepared by charging the same into a closed and agitated reactor under a nitrogen atmosphere at a temperature of from about 20° to about 90° C., more preferably of from about 30° to about 80° C., and for a time of from about 1 to about 24 hours and more preferably of from about 1 to about 6 hours. The prepolymer is cooled to about 40° C. and kept for at least 24 hours at a temperature of from about 30 to about 40° C., before being reacted with the propoxylated amine.

The following examples are illustrative of the invention.

EXAMPLES OF THE INVENTION

EXAMPLE 1

Polyurethane compositions containing an aliphatic polyisocyanate, a propoxylated polyether amine, and adhesion-improving polyols, were prepared in the presence of various catalysts and tested for cure and bubbling.

A prepolymer of an aliphatic polyisocyanate and two high molecular weight adhesion-improving polyols was prepared by blending in a reactor and under a dry nitrogen atmosphere, 1478 grams of isophorone diisocyanate (sold by Chemische Werke Huls A.G., Marl, West Germany), 862 grams of Niax ® Polyol PCP 0210 (a polycaprolactone diol of equivalent weight 417.5 by hydroxyl content, sold by Union Carbide Corp., New York, N.Y.), and 319 grams of Niax ® Polyol D-737 (a polycaprolactone butylene adipate copolymer diol of equivalent weight 1504 by hydroxyl content, sold by Union Carbide Corp., New York, N.Y.). The mixture was stirred and heated to 80° C. for two hours and then cooled and let stand at room temperature (about 24° C.) for three days. The theoretical NCO content was 17.4% and by analysis was 17.3%.

A propoxylated polyether amine was prepared according to the following procedure. 1,000 g of Jeffamine ® D-2000 (Texaco Inc., Houston, Tex.) and 10 g of water were mixed in a one-half gallon kettle. The kettle was then evacuated and purged with prepurified nitrogen. 140 g of propylene oxide was slowly added and reacted at 170°–172° C. at 60 psig; approximately 5 to 6 hours were required for addition of the Propylene oxide to avoid refluxing of propylene oxide. After a 3 hour digestion period, the product was vacuum stripped to a minimum pressure and nitrogen stripped while cooling. It was then drained from the kettle. The acetylatable and amine content of the propoxylated amine in milliequivalents per gram was:

| Total acetylatables | 1.75 |
|---|---|
| Total amine | .925 |
| Tertiary amine | .84 |
| Secondary amine | .08 |
| Primary amine | .004 |

Various catalysts, as set forth in Table 1, were added to 55 g of the propoxylated amine followed by 26.6 g of the prepolymer and hand-mixed.

Two tests for bubble formation were conducted. In the first, a 1/16 inch layer of the composition was smeared over a dripping wet paper towel and the same sandwiched between two sheets of polyethylene to prevent evaporation. In the second test, about 40 grams of the composition were cured in a 100 cc container into which was placed a wet wooden tongue depressor which had been presoaked in water for 30 minutes. After 24 hours the presence of gas development (bubbles) was checked in the cured samples. The results are shown in Table 1. With some catalysts curing problems were observed as noted in Table 1. An absence of or minimal bubbling and a satisfactory cure was achieved for compositions prepared with the following catalysts: zinc acetyl acetonate; zinc octoate; copper acetyl acetonate; copper stearate; copper naphthenate; and ferric acetyl acetonate.

TABLE 1

| Catalyst | Grams of catalyst | Gassing over wet towel | Gassing at wet stick |
|---|---|---|---|
| Dibutyl tin dilaurate | .0082 | considerable | very severe |
| Dibutyl tin diisooctyl thioglycolate | .123 | severe | considerable |
| Dibutyl tin sulfide | .138 | * | severe |
| Dimethyl tin dilaurate | .221 | * | severe |
| Dioctyl tin dilaurate | .106 | * | * |
| Zinc acetyl acetonate | .052 | slight | none |
| Zinc octoate | .068 | slight | slight |

TABLE 1-continued

| Catalyst | Grams of catalyst | Gassing over wet towel | Gassing at wet stick |
|---|---|---|---|
| | | (poor cure) | |
| Copper acetyl acetonate | .138 | none | very slight |
| Copper stearate | .047 | none | none |
| Copper naphthenate | .098 | slight | none |
| Ferric acetyl acetonate | .138 | slight | slight |
| Calcium decanoate | .105 | * | considerable (poor cure) |
| Triethylene diamine | .123 | * | * |

*did not cure

EXAMPLE 2

The compositions of Example 1 which cured satisfactorily were prepared again and tested for bubbling and peel strength on soaking wet cellulosic membranes.

The compositions were spread at a thickness of approximately 30 mils over a water-saturated 1 inch by 7 inch and about 0.5 mm thick strip of cast cellulose acetate permeable membrane film. A water-saturated 1 inch by 7 inch coarsely woven polyester fabric was pressed lightly onto the coated film and the laminated assembly was stored for 24 hours at room temperature (about 24° C.) at a relative humidity of 100%. After 24 hours the bond was examined for cure and after 48 hours the laminates were subjected to the T-Peel test described in ASTM D1876-72. An Instron-type testing machine was used at a separation speed of 2 inch/min. Two samples were tested to determine an average peel strength as set forth in Table 2. Substantially improved peel strength and an absence of bubbling were achieved for composition prepared with the following catalysts: zinc acetyl acetonate, zinc octoate, copper acetyl acetonate, copper sterate, copper naphthenate, and ferric acetyl acetonate.

TABLE 2

| Catalyst | Grams of catalyst | Cure | Gassing | Peel Strength (lbs/inch) |
|---|---|---|---|---|
| Dibutyl tin dilaurate | .0082 | O.K. | yes | 0.10 |
| Dibutyl tin diisooctyl thioglyolate | .123 | poor | yes | 0.10 |
| Dibutyl tin sulfide | .138 | fair | yes | 0.05 |
| Dimethyl tin dilaurate | .221 | poor | yes | 0.30* |
| Zinc acetyl acetonate | .052 | O.K. | no | 0.55 |
| Zinc octoate | .068 | O.K. | trace | 0.40 |
| Copper acetyl acetonate | .0139 | O.K. | no | 1.20 |
| Copper stearate | .047 | O.K. | no | 0.35 |
| Copper naphthenate | .098 | O.K | no | 0.50 |
| Ferric acetyl acetonate | .052 | O.K. | trace | 0.40 |

*high value because only cured to sticky, gummy state

EXAMPLE 3

A variety of polyols were tested as possible substitutes for the propoxylated polyether amine.

Seven catalyzed polyol mixtures were prepared by premelting 0.10 g of zinc acetyl acetonate into each of the polyols listed in Table 3. Each of the polyols had a D molecular weight between 1000 and 6000. Niax ® 11-27 is an ethylene oxide tipped polypropylene glycol triol. Niax ® 34-28 is well-known in the art as a polymer polyol. Niax ® D-737 is a polycaprolactone butylene adipate copolymer diol of eq. weight 1504 by hydroxyl content. Niax ® E-388 is an ethylene oxide propylene oxide copolymer triol. "Rucoflex" S1011-55 (registered trademark of Hooker Chemical & Plastics Corp., Niagara Falls, N.Y.) is an ethylene butylene adipate. "Teracol" 1000 (registered trademark of E. I. DuPont DeNemours & Co., Wilmington, Del.) is a polybutylene oxide diol.

The catalyzed polyol mixtures were allowed to cool overnight to room temperature before reaction with isophorone diisocyanate at an NCO/OH ratio of 1.03/1.0. The compositions were tested as in Example 1 for gassing over a wet towel and gassing at a wet stick. The only polyols which successfully cured and did not contain excessive bubbles were Niax ® D-737 (marginal results) and the propoxylated polyether amine from Example 1. This demonstrates that the pressure of the propoxylated polyether amine of formula (B) is critical. It was found that the reaction of castor oil and isophorone diisocyante in the presence of zinc acetyl acetonate caused considerable bubble formation.

TABLE 3

| Polyol | Gassing over wet towel | Gassing at wet stick | Cure |
|---|---|---|---|
| Niax ® 11-27 | considerable | slight | O.K. |
| Niax ® 34-28 | considerable | considerable | O.K. |
| Niax ® D-737 | slight | slight | O.K. |
| Niax ® E-388 | considerable | considerable | O.K. |
| Rucoflex ® S1011-55 | considerable | slight | O.K. |
| Teracol ® 1000 | considerable | considerable | O.K. |
| Castor Oil | considerable | considerable | O.K. |
| Propoxylated polyether amine from Example 1 | trace | none | O.K. |

Example 4

A prepolymer of an aliphatic polyisocyanate and an adhesion-improving polyol was reacted with a catalyst/chain extender/polyol composition. The resultant polyurethane compositions were cast with a bundle of hollow cellulose fibers and tested for potting time, cutting time, and gassing.

A prepolymer of an aliphatic polyisocyanate and an adhesion-improving polyol was prepared by blending under a dry nitrogen atmosphere, 1383 g of isophorone diisocyanate and 1011 g of Niax ® Polyol PCP 0210 (polycaprolactone). The mixture was stirred and heated at a temperature between 60° C. and 80° C. for one hour. The mixture was then cooled to 45° C. and let stand at between 40° and 45° C. for 24 hours. The NCO content by analysis was 17.3% which corresponds to an equivalent weight of 243 by hydroxyl content.

The above prepolymer at 50° C., was reacted with each of the three catalyst/chain extender/polyol compositions listed in Table 4, also at 50° C., and at an NCO-/OH ratio of 1.05. Niax ® Polyol PCP-0210, as discussed previously, is a polycaprolactone. Quadrol ® is a low molecular weight chain extender polyol sold by BASF Wyandotte Corp., Parsippany, N.J. Niax ® LHT-240 is a polypropylene glycol triol having a molecular weight of 750 sold by Union Carbide Corp., New York, N.Y. Voranol 2025 is a very low molecular weight chain extender polyol of polypropylene glycol triol sold by Dow Chemical Co., Midland, Mich.

A hollow fiber bundle of regenerated cuprammonium cellulose (Cuprophan) was cast in a dialyzer housing with each of the three compositions in accordance with the known centrifugal process for embedding membranes. After mounting the hollow fiber-filled housing in the centrifuge, the embedding material was introduced into the centrifuge through a filling device in the dialyzer housing at a centrifuge speed of about 700 rpm. During filling and centrifuging, the centrifuge and its contents were maintained at a temperature of about 50°

C. The hollow fibers had previously been stored at room temperature for one week at 80% relative humidity. After 5 minutes of centrifuging, the centrifuge was turned off and the dialyzer housing removed with the hollow fiber bundle mounted in the substantially cured embedding material. The potted ends of the cartridge were cut with a guillotine to expose open ends of the hollow fibers fused in the cured material. As listed in Table 4, pot life is the time during which the polyurethane remains liquid and usable. Cutting time is the time required after removal from the centrifuge before a clean cut can be made, i.e., without sticking or smearing of the urethane or deformation of the fibers.

The first composition achieved a substantially improved cutting time and no gassing, establishing once again the critical presence of a propoxylated polyether amine of formula (B). Similar results were also achieved when the first composition was tested with hollow fibers of cellulose acetate and saponified cellulose acetate.

TABLE 4

| | Equi-valents | Pot Life @ 24° C. (min.) | Firm Rubbery Set Time @ 50° C. (min.) | Cutting Time (min.) | Gassing |
|---|---|---|---|---|---|
| Propoxylated polyether amine of Example 1 | .2438 | 5 | 10 | 15 | none |
| Niax ® PCP-0210 | .1441 | | | | |
| Quadrol ® | .6121 | | | | |
| Zn acetyl acetonate-0.1 g | — | | | | |
| Niax ® LHT-240 | 0.20 | 6 | 14 | 45 | severe |
| Voranol 2025 | 0.80 | | | | |
| Zn acetyl acetonate-0.36 g | — | | | | |
| Castor Oil-Urethane grade | 0.40 | 4.5 | 10 | 40 | considerable |
| Quadrol ® | 0.60 | | | | |
| Zn acetyl acetonate 0.73 g | — | | | | |

EXAMPLE 5

Various aliphatic isocyanates and one aromatic isocyanates were each mixed with a catalyst/chain extender/polyol composition and tested for gassing.

The catalyst/chain extender/polyol compositions included:

| | Equivalents |
|---|---|
| Propoxylated polyether amine of Example 1 | .2438 |
| Niax ® PCP-0210 | .1441 |
| Quadrol ® | .6121 | and various amounts of zinc acetyl acetonate as shown in Table 5.

Twenty four grams (0.1 equivalents) of the catalyst/chain extender/polyol was mixed with 0.1 equivalents of the various polyisocyanates listed in Table 5 and immediately after mixing, bundles of regenerated cellulose hollow fibers which had been stored in at 50% relative humidity were inserted into the mixture. In each case, the amount of catalyst used was adjusted to yield about a five minute gel time.

The gel time and gassing for each mixture are shown in Table 5. The aromatic based isocyanate (Isonate 143-L) caused excessive gassing in spite of its rapid reaction rate. Each of the aliphatic polyisocyanates exhibited none or minimal gassing. This demonstrates the critical presence of an aliphatic polyisocyanate of formula (A).

TABLE 5

| Polyisocyanate | Zn acetyl acetonate (weight %) | Gel time (minutes) | Gassing |
|---|---|---|---|
| Isophorone diisocyanate | 0.14 | 5 | trace |
| Desmodur L-100 (Biuret of hexamethylene diisocyanate) | 0.29 | 5 | none |
| Tetramethyl xylene diisocyanate | 0.14 | 6 | trace |
| Desmodur W (technical methylene bis cyclohexyl isocyanate) | 0.29 | 5 | trace |
| Trimethyl hexamethylene diisocyanate | 0.08 | 7 | slight |
| Isonate 143-L (liquid form of 4,4' methylene bis (diphenyl diisocyanate) | none | 2 | considerable |

EXAMPLE 6

In a theoretical example, the series of polypropylene amines listed in Table 6 are propoxylated using the procedure of Example 1. About 90% of the amine is converted to tertiary amine. The propoxylated amine is reacted with isophorone diisocyanate at an NCO/OH ratio of 1.0 in the presence of 0.1% by weight of zinc acetyl acetonate. The compositions react smoothly to yield hard rubbers, significantly harder than the polypropylene amines alone. Small bundles of regenerated cellulose hollow fibers aged at 50% relative humidity are immersed in the freshly mixed compositions. No significantly gassing is observed.

TABLE 6

| Amine | Approx. eq. wt. based on primary amine content | Function-ality | Hardness (Shore D) |
|---|---|---|---|
| Jeffamine ® D-400 | 203 | 2 | 50 |
| Jeffamine ® D-230 | 120 | 2 | 85 |
| Jeffamine ® T-403 | 162 | 3 | 80 |

I claim:

1. A hollow-fiber, fluid separatory device comprising a bundle of fine hollow fibers whose end portions are potted in a tube-sheet and whose open fiber ends terminate in a tube-sheet face, the bundle being sealed within a casing to form a separatory cell having one or more fluid ports which allow for the passage of one fluid through the fibers and another around the fibers without mixing of the two fluids, said tube-sheet comprising a cured polyurethane composition which is substantially bubble-free although cured in the presence of moisture, said composition comprising the reaction product of an aliphatic polyisocyanate with a propoxylated polyether amine in the presence of a metalloorganic catalyst selected from the group consisting of the organic acid salts and the β-diketonates of zinc, iron, copper, manganese, mercury, lead, and mixtures thereof, and said catalyst being present in an amount effective to substantially increase the cure rate and permit curing in the presence of moisture without significant bubble formation.

2. The device of claim 1 wherein said composition has a ratio of NCO/OH of from about 0.5 to about 1.5 and said metallo-organic catalyst comprises of from about 0.001 to about 5.0% by weight of said composition.

3. The device of claim 2 wherein:
said aliphatic polyisocyanate has the formula:

(A)

were $R_1$ has from 2 to 36 C atoms, said —NCO groups are not directly bonded to an aromatic ring, and X is an integer of at least 2; and
said propoxylated polyether amine has the formula:

(B)

where $R_2$ is a linear or slightly branched predominantly polyisopropoxy chain having a molecular weight of from about to about 8000, $R_3$ is selected from the group consisting of isoproproxy and diisopropoxy, and Y is an integer of at least 2.

4. The device of claim 3 wherein said metallo-organic catalyst is selected from the organic acid salts and the β-diketonates of zinc, iron, copper, and mixtures thereof.

5. The device of claim 4 wherein said metallo-organic catalyst is selected from the group consisting of the acetyl acetonates of zinc, iron, copper, and mixtures thereof.

6. The device of claim 5 wherein said metallo-organic catalyst is zinc acetyl acetonate.

7. A scroll-type fluid separatory device comprising a central permeate tube around which is wrapped a mesh spacer and a sandwich bag, said sandwich bag including a plurality of layers joined along their edges by an adhesive composition and said layers including a first semipermeable membrane, a first backing, a permeate carrier, a second backing, and a second semipermeable membrane, said adhesive composition comprising a cured polyurethane composition which is substantially bubble-free although cured in the presence of moisture, said polyurethane composition comprising the reaction product of an aliphatic polyisocyanate with a propoxylated polyether amine in the presence of a metello-organic catalyst selected from the group consisting f the organic acid salts and the β-diketonates of zinc, iron, copper, manganese, mercury, lead, and mixtures thereof, and said catalyst being present in an amount effective to substantially increase the cure rate and permit curing in the presence of moisture without significant bubble formation.

8. The device of claim 7 wherein said composition has a ratio of NCO/OH of from about 0.5 to about 1.5 and said metallo-organic catalyst comprises of from about 0.001 to about 5.0% by weight of said composition.

9. The device of claim 8 wherein:
said aliphatic polyisocyanate has the formula:

$R_1(NCO)_X$  (A)

where $R_1$ has from 2 to 36 C atoms, said —NCO groups are not directly bonded to an aromatic ring, and X is an integer of at least 2; and
said propoxylated polyether amine has the formula:

(B)

where $R_2$ is a linear or slightly branched predominantly polyisopropoxy chain having a molecular weight of from about 200 to about 8000, $R_3$ is selected from the group consisting of isoproproxy and diisopropoxy, and Y is an integer of at least 2.

10. The device of claim 9 wherein said metallo-organic catalyst is selected from the group consisting of the organic acid salts and the β-diketonates of zinc, iron, copper, and mixtures thereof.

11. The device of claim 10 wherein said metallo-organic catalyst is selected from the group consisting of the acetyl acetonates of zinc, iron, copper, and mixtures thereof.

12. The device of claim 11 wherein said metallo-organic catalyst is copper acetyl acetonate.

13. A polyurethane potting and adhesive composition comprising a cured polyurethane composition which is substantially bubble-free although cured in the presence of moisture, said polyurethane composition consisting essentially of the reaction product of an aliphatic polyisocyanate with a propoxylated polyether amine in the presence of a metallo-organic catalyst selected from the group consisting of the organic acid salts and the β-diketonates of zinc, iron, copper, maganese, mercury, lead, and mixture thereof, and said catalyst being present in an amount effective to substantially increase the cure rate and permit curing in the presence of moisture without significant bubble formation.

14. The composition of claim 13 wherein said aliphatic polyisocyanate is from about 10 to about 50% by weight of said composition, said propoxylated polyether amine is from about 20 to about 90% by weight, and said metallo-organic catalyst is from about 0.001 to 5.0% by weight.

15. The composition of claim 14 wherein said aliphatic polyisocyanate is from about 15 to about 40% by weight of said composition, said propoxylated polyether amine is from about 20 to about 85% by weight, and said metallo-organic catalyst is from about 0.005 to about 3.0% by weight.

16. The composition of claim 15 wherein said aliphatic polyisocyanate is from about 17 to about 35% by weight of said composition, said propoxylated polyether amine is from about 20 to about 80% by weight, and said metallo-organic catalyst is from about 0.01 to about 0.5% by weight.

17. The composition of claim 13 wherein:
said aliphatic polyisocyanate has the formula:

$R_1(NCO)_X$  (A)

where $R_1$ has from 2 to 36 C atoms, said —NCO groups are not directly bonded to an aromatic ring, and X is an integer of at least 2; and
said propoxylated polyether amine has the formula where R₂ is a linear or slightly branched predominantly polyisopropoxy chain having a molecular weight of from about 200 to about 8000, R₃ is selected from the group consisting of isopropoxy and diisopropoxy, and Y is an integer of at least 2.

18. The composition of claim 17 wherein said propoxylated polyether amine is completely isoproxy and predominantly a tertiary amine.

19. The composition of claim 18 wherein said aliphatic polyisocyanate is selected from the group consisting of isophorone diisocyanate, ethylene diisocyanate, propylene diisocyanate, hexamethylene diisocyanate, decamethylene diisocyanate, cyclohexylene diisocyanate, 2,4′-methylene bis (cyclohexyl isocyanate), 4,4′-methylene bis (cyclohexyl isocyanate), the biuret of hexamethylene diisocyanate, trimethyl hexamethylene diisocyanate, and tetramethyl xylene diisocyanate.

20. The composition of claim 19 wherein said aliphatic polyisocyanate is isophorone diisocyanate.

21. The composition of claim 20 wherein said metallo-organic catalyst is selected from the group consisting of the acetyl acetonates of zinc, iron, copper, and mixtures thereof.

22. The composition of claim 21 further including a low molecular weight chain-extender polyol in an amount effective to substantially increase the hardness of the cured composition.

23. The composition of claim 22 wherein said low molecular weight chain-extender polyol is tetrahydroxypropylethylenediamine.

24. The composition of claim 21 further including of from about 5 to about 30% by weight of said composition of an adhesion-improving polyol having a molecular weight of at least about 200 in an amount effective to substantially increase the adhesion of said composition to cellulosic substrates.

25. The composition of claim 24 wherein the peel strength of said composition bonded to wet cellulose acetate film is greater than about 0.2 lbs/inch.

26. The composition of claim 25 wherein said adhesion-improving polyol is selected from the group consisting of polycaprolactones, adipic acid derived polyesters, and mixtures thereof.

27. The composition of claim 26 wherein said adhesion-improving polyol is selected from the group consisting of polycaprolactone diols and triols having a molecular weight of less than about 1000.

28. A method for preparing a polyurethane composition which is substantially bubble-free although cured in the presence of moisture, said method comprising reacting an aliphatic polyisocyanate with a propoxylated polyether amine in the presence of a metallo-organic catalyst selected from the group consisting of the acid salts and the β-diketonates of zinc, iron, copper, manganese, mercury, lead, and mixtures thereof, said catalyst being present in an amount effective to substantially increase the cure rate and permit curing in the presence of moisture without significant bubble formation.

29. The method of claim 28 further including the addition of an adhesion-improving polyol having a molecular weight of at least about 200 in an amount effective to substantially increase the adhesion of said composition to cellulosic substrates, said method including the initial step of preparing a prepolymer of said adhesion-improving polyol and said a polyisocyanate.

30. The method of claim 29 wherein said adhesion-improving polyol is selected from the group consisting of polycaprolactones, adipic acid derived polyesters, and mixtures thereof, and comprises of from about 5 to about 30% by weight of said composition.

31. A cellulosic substrate adhered to an adhesive composition, said adhesive composition comprising a cured polyurethane composition which is substantially bubble-free although cured in the presence of moisture, said polyurethane composition comprising the reaction product of an aliphatic polyisocyanate with a propoxylated polyether arine in the presence of a metallo-organic catalyst selected from the group consisting of the organic acid salts and the β-diketonates of zinc, iron, copper, manganese, mercury, lead, and mixtures thereof, and said catalyst being present in an amount effective to substantially increase the cure rate and permit curing in the presence of moisture without significant bubble formation.

32. The cellulosic substrate of claim 31 wherein said substrate is selected from the group consisting of cellulose, regenerated cellulose, cellulose esters, cellulose ethers, and nitrated cellulose.

33. The cellulosic substrate of claim 32 wherein said substrate is selected from the group consisting of regenerated cellulose and cellulose acetate.

34. The cellulosic substrate of claim 31 wherein said aliphatic polyisocyanate is from about 10 to about 50% by weight of said composition, said propoxylated polyether amine is from about 20 to about 90% by weight, and said metallo-organic catalyst is from about 0.001 to 5.0% by weight.

35. The cellulosic substrate of claim 34 wherein said composition further includes of from about 5 to about 30% by weight of said composition of an adhesion-improving polyester polyol having a molecular weight of at least about 200 to substantially increase the adhesion of said composition to said cellulosic substrate.

36. The cellulosic substrate of claim 35 wherein said adhesion-improving polyester polyol is selected from the group consisting of polycaprolactones, adipic acid derived polyesters, and mixtures thereof.

* * * * *

UNITED STATES PATENT AND TRADEMARK OFFICE
CERTIFICATE OF CORRECTION

PATENT NO. : 4,879,032

DATED : November 7, 1989

INVENTOR(S) : Zemlin

It is certified that error appears in the above-identified patent and that said Letters Patent is hereby corrected as shown below:

Col. 1, line 26 - change "example" to -- examples --.

Col. 1, line 55 - change "1.1'1" to -- 1.1:1 --.

Col. 11, line 59 - celete "D".

Col. 13, lines 44 and 45 - change "isocyanates" (second instance) to -- isocyanate --.

Col. 14, line 31 - change "0 1%" to -- 0.1% --.

Col. 15, line 23 - after "about" (first instance) insert -- 200 --.

Col. 18, line 27 - change "arine" to -- amine --.

Signed and Sealed this

Thirtieth Day of October, 1990

*Attest:*

HARRY F. MANBECK, JR.

*Attesting Officer*   *Commissioner of Patents and Trademarks*